April 25, 1933.   A. J. WEATHERHEAD, JR., ET AL   1,905,665
METHOD OF PRODUCING COUPLINGS
Filed Oct. 29, 1929
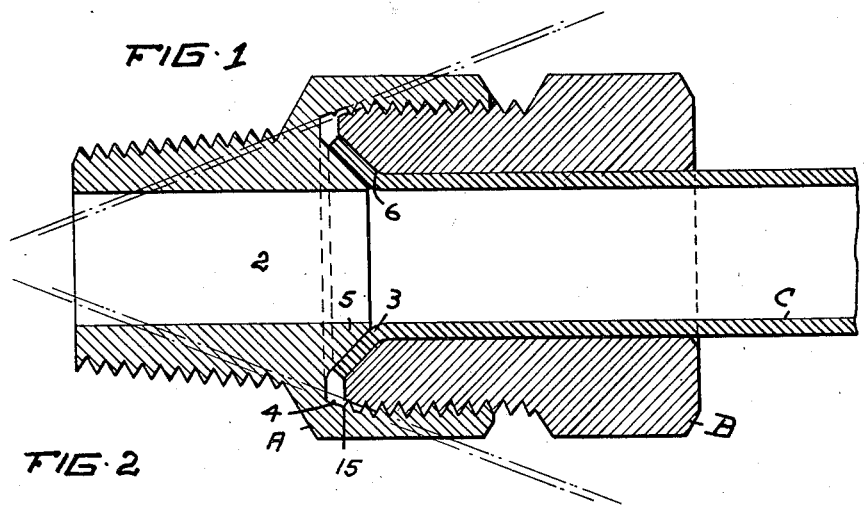
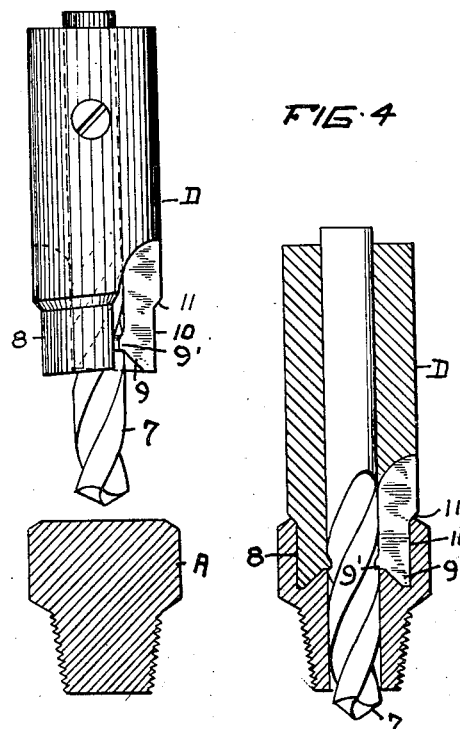
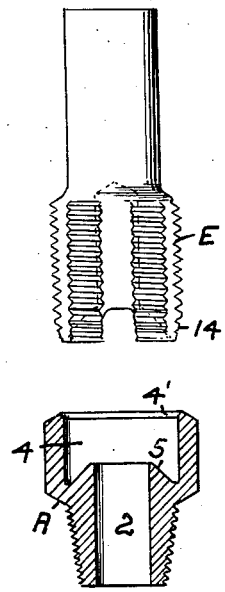
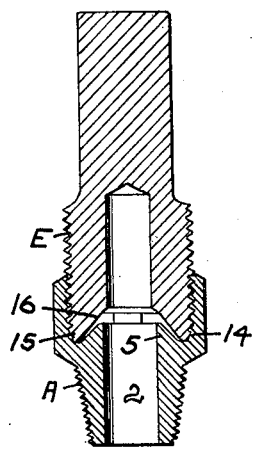
INVENTOR
ALBERT J. WEATHERHEAD JR.
JOHN D. BALDWIN JR.
BY
Fisher, Moser & Moore
ATTORNEY Patented Apr. 25, 1933

1,905,665

UNITED STATES PATENT OFFICE

ALBERT J. WEATHERHEAD, JR., AND JOHN D. BALDWIN, JR., OF CLEVELAND, OHIO; SAID BALDWIN ASSIGNOR TO SAID WEATHERHEAD

METHOD OF PRODUCING COUPLINGS

Application filed October 29, 1929. Serial No. 403,228.

Our invention pertains to a method of producing pipe couplings, and the object of the invention in general is to simplify and expedite the production of a coupling member containing a screw-threaded chamber having a forwardly-projecting cone at its bottom against which a flanged pipe may be clamped with fluid-tight sealing effect by a tubular nut sleeved over the pipe and screwed into the chamber. The invention is predicated on the idea of reducing the number of operations to a minimum as compared with other methods known to us for producing similar coupling members, and the steps actually taken involve only two operations, the first consisting in boring, shaping and drilling the piece or part in a single operation to the desired shape and form, and the second, consisting in tapping the product of the first step in a single operation without chasing the screw-threads or causing malformation or injury to the finished conical seat within the same.

In the accompanying drawing, Fig. 1 is a sectional view, on an enlarged scale, of a pipe coupling, including a flanged pipe clamped between the two pieces or members comprising the coupling. Figs. 2 to 7 inclusive, are side elevations and sectional views, of the tools and the coupling member produced thereby, Fig. 2 being a side view of the boring, shaping and drilling tool; Fig. 3 a sectional view of the solid piece or part about to be operated by the aforesaid tool; Fig. 4 a sectional view of said tool and part illustrating the first operation; Fig. 5 a side elevation of a tap, or screw-threading tool; Fig. 6 a sectional view of the product of the first operation; and Fig. 7 a sectional view of the tap operating on said product.

The pipe coupling shown in Fig. 1 comprises a female member or body A, and a tubular male member or nut B, whereby a flanged tube or pipe C may be united to body A in communication with a fluid passage 2 therein and with a fluid-tight joint at the flanged end 3 of the tube or pipe. Body A may be of any desired shape or form, but to connect the flanged pipe thereto it is provided with a screw-threaded chamber or cavity 4 of larger diameter than passage 2 to receive nut B, and the bottom of the chamber or cavity is formed with a forwardly-projecting cone or conical seat 5 for the flanged end 3 of the pipe. Cone 3 may be of any desired shape or form, but as shown its sides are inclined at about 45° to the axis thereof, and the nut is provided with a flaring mouth 6 inclined or tapered to the same angle as the sides of the cone.

In practicing the present method, body A representing the female member of the coupling, is fashioned externally to any desired form, and may be assumed to embody a solid body or wall where the coupling seat and pipe connections are to be produced therein. This body or member is secured within a jig or a chuck, and in operations may be revolved or held stationary, depending on whether the tool or tools in the machine or appliance used in the operations revolve or are held stationary. For example, body A may be fixed immovably, and the tool used in the first operation may revolve. Thus, referring to Figs. 2 and 3, the tool D shown therein opposite solid body A may be revolved and fed forward relatively to body A, and then reversed and withdrawn. That single operation produces fluid passage 2 and chamber 4, including cone 5, the fluted drill 7 of tool D beginning the drilling of passage 2 and a second boring and shaping cutter 8 coming into action and producing chamber 4 and cone 5 after drill 7 has entered solid body A a substantial distance and while drilling of passage 2 is still proceeding. Cutter 8 is a cylindrical piece carrying drill 7, and the end of this cutter is formed with straight and slanting cutting edges 9 radially thereof to cut the stock surrounding drill 7 on flaring lines and to bore the larger chamber 4 concentrically in respect to passage 2. The first engagement of the cutting end edges 9 of boring tool 8 with the flat outer face of body A produces a gradually deepening channel around the drill until a flaring channel and conical formation corresponding to the complete cutting edges of the tool is obtained. Then drilling and boring proceed until the drill and cutter reach a predetermined depth in body A, the side wall of chamber 4 being finished smoothly by the straight cutting edges 10 longitudinally at the sides of boring and shaping tool 8. An outwardly inclined cutting edge 11 merging with the straight cutting edge 10 then chamfers or bevels the corner edge of the stock at the mouth of the opening or chamber 4 as the compound boring, shaping and drilling tool reaches the end of its feed movement. As the tools continue to revolve a bit without feeding forward and before they are withdrawn, the last revolutions of cutter 8 finish the chamber wall and the cone smoothly and uniformly to the exact outlines of the cutting edges of the tools.

In that connection it is highly desirable to avoid the production of a burr or an irregular edge at the truncated end of the cone, and the boring and shaping tool 8 is therefore provided with one or more lateral cutting projections 9' extending inwardly from the inclined cutting edge 11 into the flutes of drill 7, see Fig. 4. In the boring and shaping operation the cutting projection 9' cuts and smoothly finishes the truncated edge of the cone either on straight or curved lines according to the shape of the cutting projection 9' as may be previously determined.

The single operation of revolving and feeding the compound tool D a predetermined distance into body A produces in a rapid and efficient way, a body having a fluid passage 2, a smooth conical seat 5 surrounding the entrance to passage 2, and a smoothly finished counterbore or larger chamber 4 having a beveled or flaring mouth 4', see Fig. 6.

The second step in producing the female coupling member, consists in feeding a tapping or screw-threading tool E into the smoothly finished chamber 4 of body A. The tap is preferably beveled or tapered at its engaging end 14 to effect cutting of a single V-shaped standard screw-thread in the internal wall of chamber 4, and so that the tap may be fed the full depth of chamber 4 to produce a tapered formation 15 and a screw-thread of graduated shape and formation in the annular area surrounding the seating cone 5, see Figs. 1 and 7. The tap is also slotted radially at its tapered end, and a flaring cavity 16 is also provided which is larger or of different angularity than cone 5 to permit the fluted tap to enter and feed to the bottom of chamber 4 without engaging or mutilating the cone. Upon withdrawal of the tap no chasing or further operation on the screw-thread within the body A is required, as the simple method herein described produces a completely-finished coupling seat and connection very rapidly, accurately and cheaply, for a flanged pipe and clamping nut of the same or general type shown in Fig. 1.

The coupling nut B shown in Fig. 1, is screw-threaded externally to fit the screw-threads in female member A, and the tip or nose of the nut is beveled or tapered to correspond to the tapering formation 15 annularly about cone 5 in member A, thereby permitting nut B to be screwed forward against the flanged pipe end 3 without impinging or jambing its nose portion against the chamber wall surrounding the cone. In other words, a space or clearance is thereby provided between the nose or tip end of the nut and the chamber wall surrounding the cone, and the degree of bevel or taper on the nut is preferable such that should distortion of the nose end of the nut occur by excessive stress and repeated use that the nut may still be removed easily and replaced readily without marring the screw-threads in female member A or affecting fluid-tight coupling results between the parts.

What we claim, is:

1. A method of producing a coupling member having a fluid-passage and screw-threaded chamber, together with a truncated conical seat having a finished truncated edge and projecting forwardly at the bottom of said chamber, consisting in forming the fluid-passage and chamber and also the truncated conical seat in a single uninterrupted cutting operation, and then tapping the chamber wall with a screw-thread.

2. A method of producing a coupling body having a fluid passage and a truncated conical seat and screw-threaded chamber adapted to receive a flanged pipe and coupling nut, consisting in drilling the passage and boring and shaping the chamber and conical seat and finishing the truncated edge of said seat in a single continuous operation, and secondly, in forming screw-threads internally of said chamber.

3. A method of producing a coupling body, consisting in drilling the fluid passage and during that operation shaping the drilled surface into a conical form with a finished edge around the drill, and in continuing said operation until a smoothly-finished circular chamber of uniform diameter and substantial depth is produced in the body, and then tapping the internal wall of said chamber with a screw-thread.

4. A method of producing a coupling body, consisting of entering a drill into the body and co-incidently cutting a flaring channel in the stock around the drill to produce a cone, in continuing the cutting of said channel and cone to a predetermined distance to provide a smoothly-finished chamber in the body, in beveling the mouth edge of the chamber in the body, and in screw-threading the internal wall of said chamber.

5. A method of producing a coupling body, consisting in entering a drill in the body and in the same operation cutting a forwardly-projecting cone in the stock around the drill and also a smoothly-finished chamber concentrically in respect to the cone, and secondly, in entering a chamfered screw-threading tap into the chamber to the bottom thereof.

6. A method of producing a coupling body, consisting in drilling a fluid passage and during that operation shaping the material around said drill into a truncated cone encircling said drill, while forming a circular chamber around said cone and finishing the edge of said cone all in a single continuous cutting operation, and then forming screw-threads internally of said chamber.

7. A method of producing a coupling body, consisting in drilling a fluid passage and during that operation shaping the material around said drill into a truncated cone, in forming a circular chamber around said cone and finishing the truncated edge of said cone and beveling the mouth of said chamber all in one operation, and then forming screw-threads internally of said chamber.

In testimony whereof we affix our signatures.

ALBERT J. WEATHERHEAD, Jr.
JOHN D. BALDWIN, Jr.